J. R. PENN.
COTTON CHOPPER MACHINE.
APPLICATION FILED JAN. 17, 1913.

1,079,577.

Patented Nov. 25, 1913.

3 SHEETS—SHEET 1.

WITNESSES:

INVENTOR
Joseph R. Penn
BY
John M. Spellman
ATTORNEY

J. R. PENN.
COTTON CHOPPER MACHINE.
APPLICATION FILED JAN. 17, 1913.

1,079,577.

Patented Nov. 25, 1913.
3 SHEETS—SHEET 2.

WITNESSES:

INVENTOR
Joseph R. Penn
BY
ATTORNEY.

UNITED STATES PATENT OFFICE.

JOSEPH R. PENN, OF DUNCANVILLE, TEXAS.

COTTON-CHOPPER MACHINE.

1,079,577. Specification of Letters Patent. Patented Nov. 25, 1913.

Application filed January 17, 1913. Serial No. 742,551.

*To all whom it may concern:*

Be it known that I, JOSEPH R. PENN, a citizen of the United States, residing at Duncanville, in the county of Dallas and State of Texas, have invented certain new and useful Improvements in Cotton-Chopper Machines, of which the following is a specification.

This invention relates to certain new and useful improvements in cotton chopper machines.

The objects of the invention are; the provision of a cotton chopper machine comprising a wheel supported frame on which is arranged a particular form of revolving and reciprocating hoe mechanism; the provision of means whereby the hoe mechanism is reciprocated longitudinally of the machine by certain driving members; the provision of construction for manually reciprocating the hoe mechanism independently of and without interfering with the operation of said hoe mechanism driving elements; the provision of lever devices for vertically adjusting the hoe carrying frame whereby the chopping depth may be governed, and for tilting the tongue of the machine whereby the hoe frame is adjusted so that the cutting edges of the hoes may be presented to various contours of the row in substantially parallel relation to said contours, thus preventing the hoes from "plowing" into the ground and causing a regular chopping at a substantially even depth along the cutting edge of the hoes; lever mechanism whereby the machine may be guided and thus the hoe mechanism maintained in line with the "stand"; and the provision of a hoe mechanism comprising a hanger carrying driving gears which are arranged to rotate a shaft on which a hoe carrying sleeve is arranged to be reciprocated by members operated by the gears.

A still further object of the invention is to provide a device of the character described that will be strong, durable, efficient, and simple and comparatively inexpensive to construct, also one in which the several parts will not be likely to get out of working order.

Figure 1:
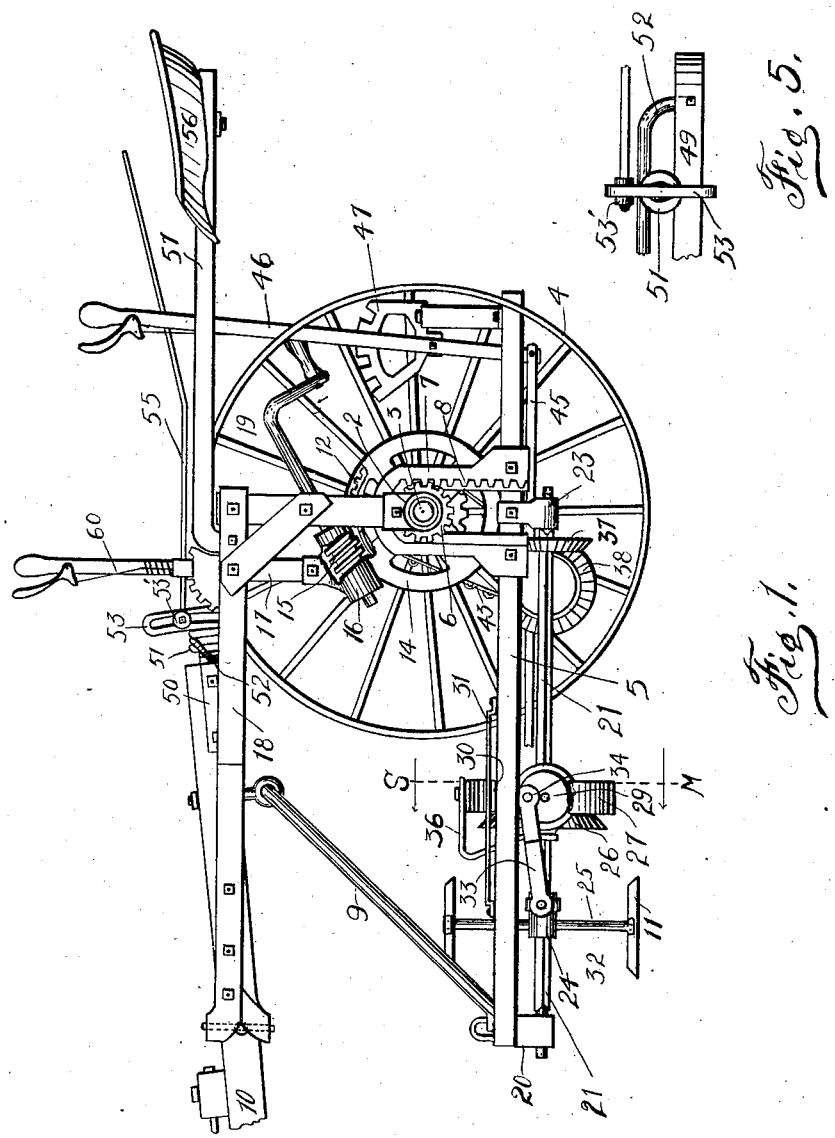
Figure 2:
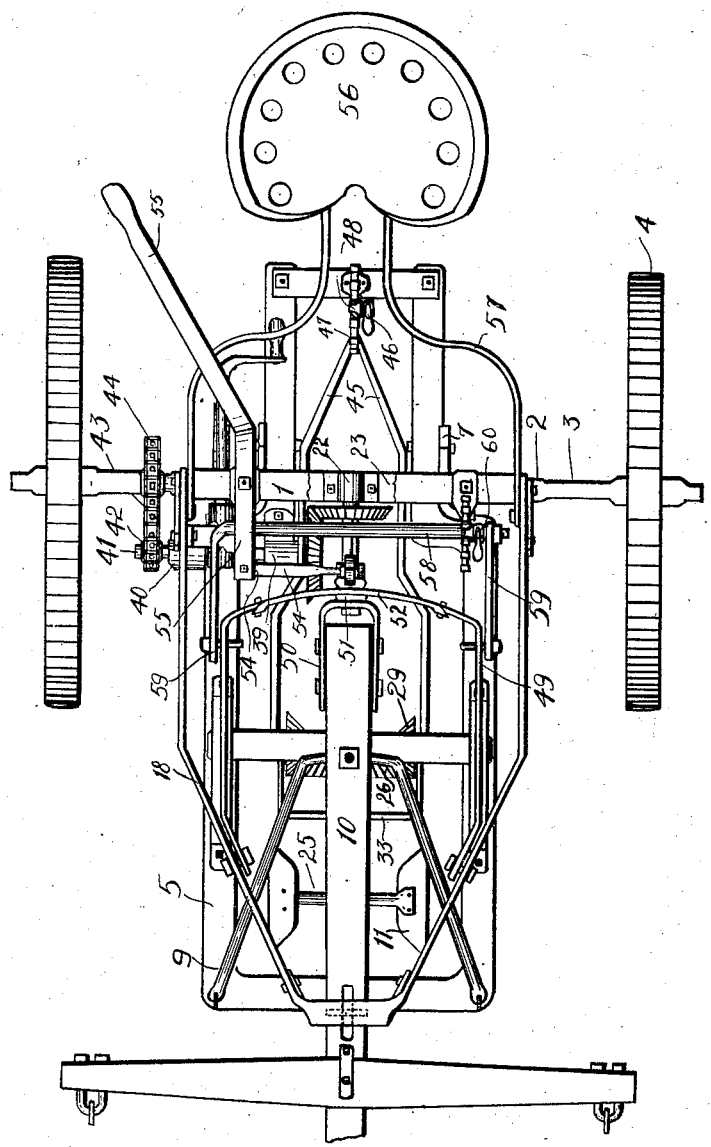
Figure 3:
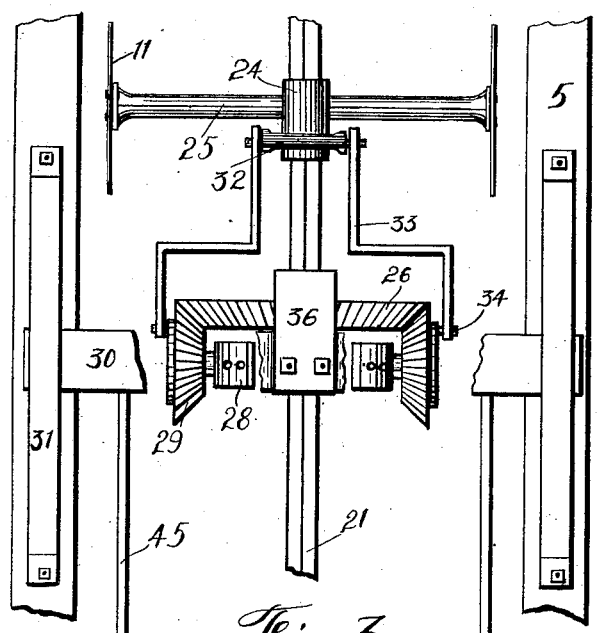
Figure 4:
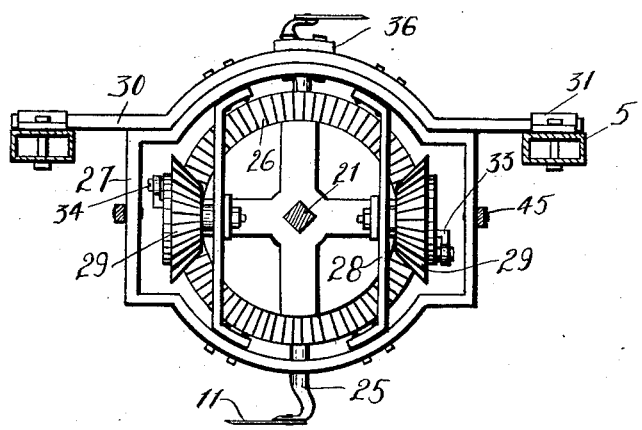

With the above and other objects in view the invention has relation to certain novel features of construction and operation, an example of which is described in the following specification and illustrated in the accompanying drawings, wherein:

Figure 1 is a side elevation of the cotton chopper machine, a portion of the frame adjusting means being shown broken away, Fig. 2 is a plan view of the same, Fig. 3 is a detail in plan of the hoe mechanism and adjacent parts, Fig. 4 is a transverse section on the line S—M of Fig. 1, the majority of the parts, however, being shown in elevation, and Fig. 5 is a detail in elevation of a part of the guiding means.

In the drawings the numeral 1 designates an arch shaped standard having bearing boxes 2 at its lower end in which an axle 3 is supported. This axle projects beyond the sides of the standard and is supported in ground wheels 4 properly spaced from the standard. Within the standard a hoe frame 5 is disposed. The greater portion of the frame extends forward of the standard and the rear portion is contracted and projects through the standard and rearward thereof as is best shown in Fig. 2. Within the standard, pinions 6 are fixed on the axle and disposed in hangers 7 fastened at their lower ends to the frame 5. Each hanger has along one inner edge, a vertical gear rack 8 with which the adjacent pinion meshes. The forward end of the frame 5 is supported by a yoke shaped member 9 pivoted to the tongue 10.

The frame 5 carries hoes 11 which, together with component mechanism will be hereinafter more specifically described. This frame being pivotally supported at its forward end is capable of being swung in a vertical plane by rotating the axle whereby the pinions travel along the gear racks. By swinging the frame 5 the chopping edges of the hoes 11 are adjusted at an angle to the longitudinal axis of the machine, and thus irrespective of the contour of the surface upon which the ground wheels are traveling, the chopping edges may be presented to the surface to be chopped in substantially parallel relation thereto. This will prevent the hoes "plowing" into the soil and will cause them to chop at an even depth along the entire lengths of their blades.

For swinging the frame 5 a worm wheel 12 is fixed on the axle 3 and inclosed in a casing 14. This worm wheel meshes with a worm 15 mounted in a bearing 16 supported on the lower end of a bracket 17 which is suspended from a top frame 18 secured to the standard 1 and extending forward. The frame 18 and the standard 1 form a main machine frame. A crank shaft 19 is secured to the worm and by turning said shaft 19 the worm and worm wheel are operated and the axle rotated, (the latter being free to rotate in the bearings 2 and wheels 4) whereby the pinions 6 are revolved and travel along the racks 8, thus raising or lowering the frame 5 according to the direction in which said crank shaft is turned.

A bearing block 20 is secured to the underside of the frame 5 at the center thereof and supports the forward end of a hoe shaft 21 which is square in cross section. The rear end of the shaft has bearing in a block 22 mounted on a cross support 23 carried by the frame 5 as shown in Figs. 1 and 2. A sleeve 24 is slidable on the shaft 21 and carries a pair of oppositely directed shanks 25 at the outer ends of which the hoes 11 are attached and disposed longitudinally of the machine. When the shaft is revolved the hoes will be swung and caused to chop transversely of the row. A bevel gear 26 is slidably mounted on the hoe shaft 21 and is revolved thereby. A gear hanger 27 is disposed adjacent to the gear 26 as is best shown in Figs. 3 and 4. This gear hanger contains a pair of uprights 28 on the outer side of which bevel pinions 29 are journaled, each engaging the gear 26 and thus being revolved in opposite directions. The gear and pinions are held in mesh by a yoke 36 secured to the hanger frame 27 and impinging the end of the hub of the gear. The gear hanger has a cross bar 30 at its upper portion extending transversely and resting on the frame 5. Keepers 31 are secured on the frame 5 and retain the cross bar in position. A ring 32 is loosely confined on the hoe sleeve 24 and a pair of links 33 extend rearwardly from trunnions on opposite sides of the ring and engage wrist pins 34 eccentrically disposed on the pinions.

It is apparent that by revolving the pinions the links 33 are operated and impart a reciprocatory movement to the hoe sleeve which is free to be revolved by the shaft 21. The particular object of the reciprocating movement is to cause the hoes to strike through the row at approximately right angles thereto. It is apparent that the forward travel of the machine would ordinarily cause the hoes to pass through the row at an angle to the transverse axis of the row, the amplitude of which angle would depend upon the speed of the machine forward. This would result in the displacement of more soil than is desirable. The gears are so arranged and timed that the rearward stroke of the sleeve will be performed as the hoes pass through the row, thus compensating the forward movement of the machine and producing a cut through the row at approximately right angles to the longitudinal axis of the same.

The hoe shaft 21 is revolved by miter gears 37 and 38 respectively, the former being fixed on the shaft and the latter being secured on a shaft 41 supported in a bearing bracket 39 carried by the frame 5. On the outer end of the shaft 41 a sprocket 42 is fastened as illustrated in Fig. 2, and is driven by a chain 43 passing about a sprocket 44 fixed on the hub of one of the ground wheels 4.

A yoke frame 45 receives the gear hanger 27 and is attached thereto, as shown in Figs. 2 and 3. This yoke frame is contracted rearwardly and terminates at the rear end of the frame 5 where it is attached to a hand lever 46 pivoted on a toothed segment 47 mounted on the frame 5. The lever has a locking plunger 48 engaging the segment. This particular mechanism has two functions, one of which is to hold the gear hanger against longitudinal displacement on the shaft 21, and the other is to manually slide the hanger 27 and the hoe sleeve through the agency of the links 33. Where the stand is irregular or it is not desired to chop out certain plants the hand lever 46 may be swung and the gear hanger and hoe sleeve slid forward or rearward and the hoes moved so as to chop out or miss the plants as desired; the operation being performed without interfering with the gear driving means.

Within the frame 18 a yoke 49 is pivoted at its free ends which are directed forward. The tongue 10 is pivoted at the forward end of the frame 18 as shown in Fig. 1. A bracket 50 is secured to rear end of the tongue as shown in Fig. 2. This bracket carries a grooved guide roller 51 which engages in a guide way 52 provided on the rear of the yoke 49 as is best shown in Fig. 5. The roller is mounted on a stub of a vertical loop 53 projecting from the bracket 50. On the standard 1 a hand guiding lever 55 is pivoted and extends rearward in convenient relation to a seat 56 supported on seat bars 57 rigidly secured at their forward ends to the frame 18 and resting on the standard as shown in Figs. 1 and 2. The lever 55 has its forward end connected to a roller 53′ in the loop 53 by means of a link 54 and it will be seen that by swinging the said lever the tongue 10 will be swung in a horizontal plane. A team being hitched to the tongue it is obvious that by swinging the lever 55 the machine may be guided and the hoe mechanism maintained over the row irrespective of the irregularity of the same, for the reason that the tongue will be thrown out of line with the longitudinal axis of the machine, the latter through the draft applied will follow the row.

As previously described the hoe frame 5 may be adjusted by the worm gearing 12 and 15 to vary the angle of inclination of the cutting edges of the hoes and prevent the same from "plowing" into the ground; however, when a ridge or depression transversely of the row is encountered, it may be desirable to quickly raise or lower the forward end of the frame 5 so that the hoes will cut to the proper depth and will not bury themselves in the ground or swing over the plants without chopping them out. It will be understood that the worm gearing lowers the rear end of the frame 5 and varies the depth of the cut of the hoes as well as the angle of inclination; but in the case just described the forward end of the frame 5 is adjusted.

For adjusting the forward end of the hoe frame as above, a rock shaft 58 is supported on the standard 1 in a suitable manner and has forwardly projecting arms 59 having inwardly extending pins engaging in opposite sides of the yoke 49. As before stated the yoke 49 is pivoted at its forward ends, and being connected to the arms 59 at its rear portion, it is apparent that by rocking the shaft 58 the yoke 49 will be swung in a vertical plane. The tongue 10 being pivoted to the frame 18 and connected to the yoke 49 at its rear end and the forward end of the frame being supported from the tongue by the member 9, when the yoke 49 is swung by the rock shaft the forward end of the frame 18 will be raised or lowered according to the swing of said rock shaft. The rock shaft 58 is swung by means of a hand lever 60 secured thereon.

From the foregoing it will be clearly seen that the hoe mechanism may be quickly and easily adjusted to meet the various conditions encountered in chopping cotton. The particular construction of the various elements for obtaining these results have been set forth and should be readily understood and appreciated by those skilled in the art.

What I claim is:

1. In a cotton chopper, the combination of a standard, ground wheels supporting the standard, a hoe frame adjustably supported in relation to the standard, a shaft mounted in the frame, driving connections between the shaft and one of the ground wheels, a gear hanger slidably mounted on the hoe frame, a gear slidable on the shaft and arranged to be revolved thereby, a pinion mounted in the gear hanger meshing with the gear, a hoe sleeve slidably mounted on the shaft and arranged to be revolved thereby, hoes radially supported by the sleeve, a link connected to the sleeve at one end and having connection at the other end with the pinion eccentrically thereof, a lever mounted on the frame, and link connections between the lever and the gear hanger.

2. In a cotton chopper, the combination with a frame mounted on ground wheels, a hoe frame in suspended relation to the first named frame, means for adjusting the hoe frame in a vertical plane, a revoluble shaft mounted longitudinally of the hoe frame, a gear hanger slidably suspended from the hoe frame, a pinion carried by the gear hanger, a gear slidably mounted on the shaft and retained in mesh relation with the pinion, a sleeve slidably mounted on the shaft, hoes carried by the sleeve, a reciprocating connection between the sleeve and the pinion, a hand operated lever slide mechanism having connection with the hanger and arranged to operate independently of the pinion and gear, and means for driving the shaft.

3. In a cotton chopper, the combination with a wheel supported main frame, a frame suspended from the main frame, a revoluble shaft mounted longitudinally of the suspended frame, driving connections between the main frame and the shaft of the suspended frame, means for adjusting the suspended frame vertically relatively of the main frame, revoluble hoes slidably mounted on the shaft, a driving device slidable on the suspended frame and connected with the shaft and the hoes, connections between the sliding device and the hoes, and means for holding the driving device against sliding.

4. In a cotton chopper, the combination with a wheel supported main frame, a frame suspended from the main frame, a revoluble shaft mounted longitudinally of the suspended frame, driving connections between the main frame and the shaft of the suspended frame, means for adjusting the suspended frame vertically relatively of the main frame, revoluble hoes slidably mounted on the shaft, a driving device slidable on the suspended frame and connected with the shaft and the hoes, connections between the sliding device and the hoes, a hand lever mounted on the suspended frame, and a connection between the hand lever and the sliding driving device.

5. In a cotton chopper, a main frame, a hoe frame suspended from the main frame, a revoluble shaft mounted on the hoe frame longitudinally thereof, hoes slidably mounted on the shaft, a hanger slidable on the hoe frame, pinions journaled in the hanger, a gear confined in the hanger in mesh with the pinions and slidably mounted on the shaft, connections between the hoes and the pinions eccentrically pivoted to the latter, means for driving the shaft, a hand lever mounted on the hoe frame, and a connection between the lever and the slidable hanger.

In testimony whereof I have signed my name to this specification in the presence of two subscribing witnesses.

JOSEPH R. PENN.

Witnesses:
 JOHN M. SPELLMAN,
 D. B. CARR.

Copies of this patent may be obtained for five cents each, by addressing the "Commissioner of Patents, Washington, D. C."